United States Patent
Deetz

(10) Patent No.: US 8,560,501 B2
(45) Date of Patent: Oct. 15, 2013

(54) METHOD FOR A CLONING PROCESS TO ENABLE CLONING A LARGER SYSTEM DRIVE TO A SMALLER SYSTEM

(75) Inventor: Randall Deetz, Costa Mesa, CA (US)

(73) Assignee: CMS Products Inc, Costa Mesa, CA (US)

( * ) Notice: Subject to any disclaimer, the term of this patent is extended or adjusted under 35 U.S.C. 154(b) by 60 days.

(21) Appl. No.: 12/910,044

(22) Filed: Oct. 22, 2010

(65) Prior Publication Data

US 2011/0099150 A1   Apr. 28, 2011

Related U.S. Application Data

(60) Provisional application No. 61/255,406, filed on Oct. 27, 2009.

(51) Int. Cl.
*G06F 7/00* (2006.01)
*G06F 17/00* (2006.01)

(52) U.S. Cl.
USPC .......................................................... 707/640

(58) Field of Classification Search
USPC .......................................................... 707/662
See application file for complete search history.

(56) References Cited

U.S. PATENT DOCUMENTS

| | | | |
|---|---|---|---|
| 2003/0167273 A1* | 9/2003 | Alexander et al. | 707/100 |
| 2004/0098383 A1* | 5/2004 | Tabellion et al. | 707/3 |
| 2007/0283111 A1* | 12/2007 | Berkowitz et al. | 711/162 |
| 2008/0104145 A1* | 5/2008 | Lipman et al. | 707/204 |

\* cited by examiner

*Primary Examiner* — Charles Lu
(74) *Attorney, Agent, or Firm* — Law Office of Scott C Harris, Inc

(57) ABSTRACT

System and method for automatically discarding sets of pre specified files or divert sets of pre specified files from the files that would normally be sent to a storage device during a backup or cloning operation as the backup device becomes full. The embodiments are used to allow a backup of a storage device onto a smaller capacity storage device with as many files as possible. The embodiments uses one or more lists of files to discard which are used to filter files as the target drive become full.

6 Claims, 8 Drawing Sheets

US 8,560,501 B2

METHOD FOR A CLONING PROCESS TO ENABLE CLONING A LARGER SYSTEM DRIVE TO A SMALLER SYSTEM

This application claims priority from provisional application No. 61/255,406, filed Oct. 27, 2009, the entire contents of which are herewith incorporated by reference.

FIELD

The embodiments relate to the field of automating the selective transfer of files from one storage device to another.

BACKGROUND

IT departments have for years created sets of storage devices that are placed into desktop and laptop computers. For the most part creating these storage devices with unique sets of software and data is, at best, a laborious and error prone process. Personal computers carried into the field are notorious for disk drive failures. Attempts to overcome this problem have been dealt with through the use of portable backup solutions ranging from the user transporting a portable storage device to the use of software on a bootable CD or DVD which then accesses a dataset over a network to rebuild the failed storage device.

For some large companies, replacement of thousands of laptops a year and the creation of thousands of replacement storage devices is commonplace. Some large companies in an attempt to reduce their workloads now require the PC vendors to place a corporate image on storage devices contained inside desktops and laptops that are purchased. While alleviating the companies from placing a corporate image onto newly purchased computers, it still requires them to install unique software programs and unique data sets for each new computer and does nothing for the problem of creating storage devices for failed units.

SUMMARY

The present embodiments are intended to overcome the shortcomings and difficulties of manually building software and datasets on individual storage devices on new computers and providing the same storage devices for failed storage devices in existing computers used in offices and for units remotely located in the field.

The present embodiments automate the process and reduce the number of human induced errors and improves the quality of software and data residing on the finished storage device.

BRIEF DESCRIPTION OF THE DRAWINGS

The embodiments can be best understood by those having ordinary skill in the art by reference to the following detailed description when considered in conjunction with the accompanying drawings in which.

DETAILED DESCRIPTION

Figure 1:
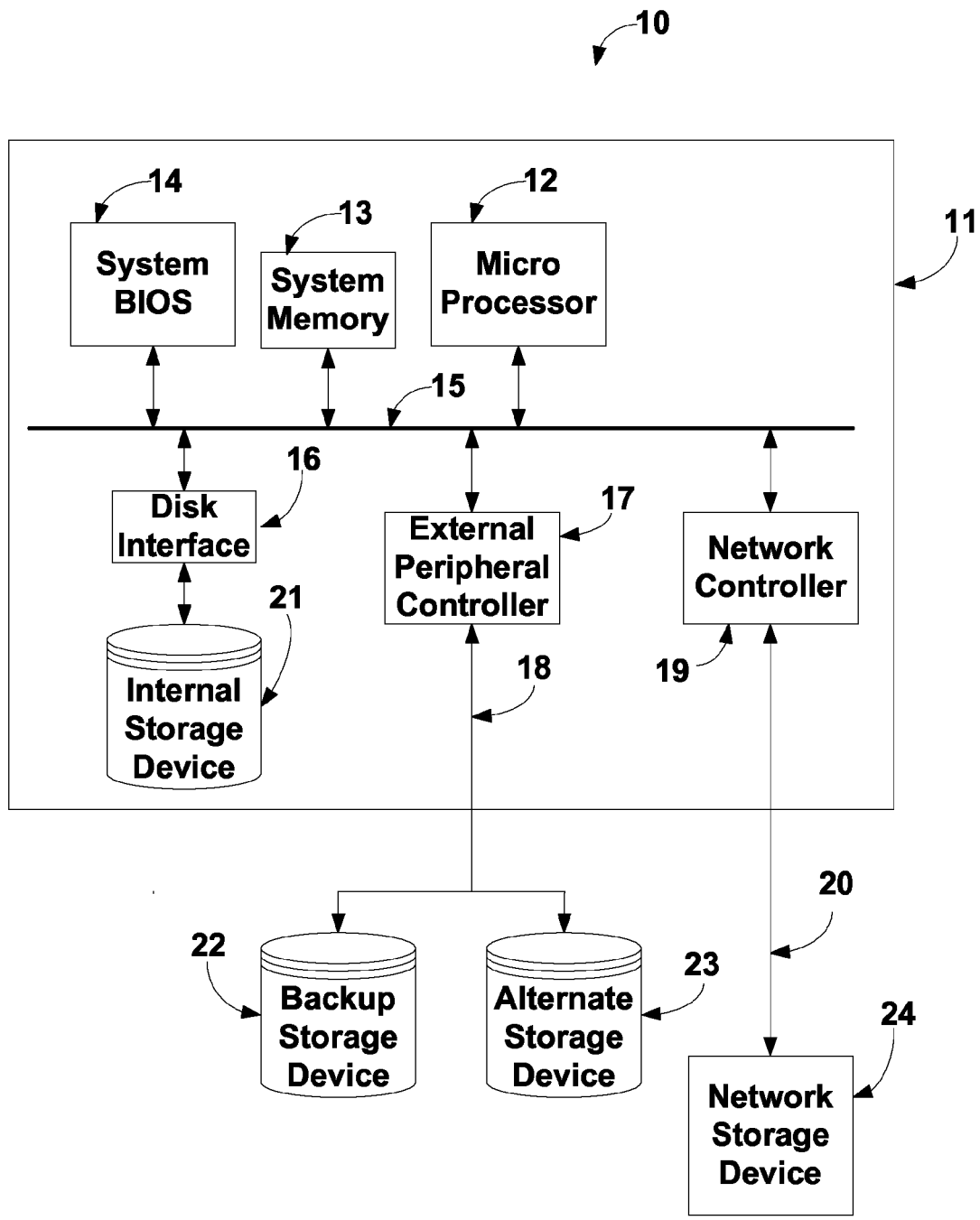
FIG. 1 is a schematic depiction of a typical personal computer system with internal storage, external storage consisting of storage physically attached to the personal computer and storage residing across a network.

As required, detailed embodiments of the present embodiments are disclosed herein; however, it is to be understood that the disclosed embodiments are merely exemplary of the embodiments, which can be embodied in various forms. Therefore, specific structural and functional details disclosed herein are not to be interpreted as limiting, but rather should be interpreted merely as a basis for the claims and as a representative basis for teaching one skilled in the art to variously employ the present embodiments in virtually any appropriately detailed structure. Further, the terms and phrases used herein are not intended to be limiting; but rather are intended to provide an understandable description of the embodiments. The terms "a" or "an," as used herein, are defined as one or more than one. The term "plurality," as used herein, is defined as two or more. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The terms "program," "software program", or "software application," and the like, as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Reference will now be made in detail to the presently preferred embodiments of the embodiments, examples of which are illustrated in the accompanying drawings. Throughout the following detailed description, the same reference numerals refer to the same elements in all figures.

Now referencing FIG. 1 where 10 is a schematic representation of a typical personal computer where said personal computer is typical of a platform where the embodiments would be used. In FIG. 1, 11 is a personal computer system having an internal system bus 15 to which is connected a number of components that make said personal computer 11 operational. These components consist of microprocessor 12 which executes control programs including an operating system and application programs, system bios 14 which contains startup and boot software, system memory 13 which provides temporary storage for said operating system and said application programs, disk interface 16 which provides the interface between internal storage device 21 and internal system bus 15, external peripheral controller 17 which provides the interface between internal system bus 15 and external bus 18 which allows external devices such as backup storage device 22 and alternate storage device 23 to be connected to personal computer system 11. Network controller 19 connects to internal system bus 15 and network 20 which in turn connects to network storage device 24. Network 20 may be a hard wired network cable such as Ethernet or may be a wireless connection such as a RF link running under a protocol referred to as 802.11. Likewise, external bus 18 may be any of but not limited to hard wired external busses such as IEEE-1394 or USB.

Figure 2:
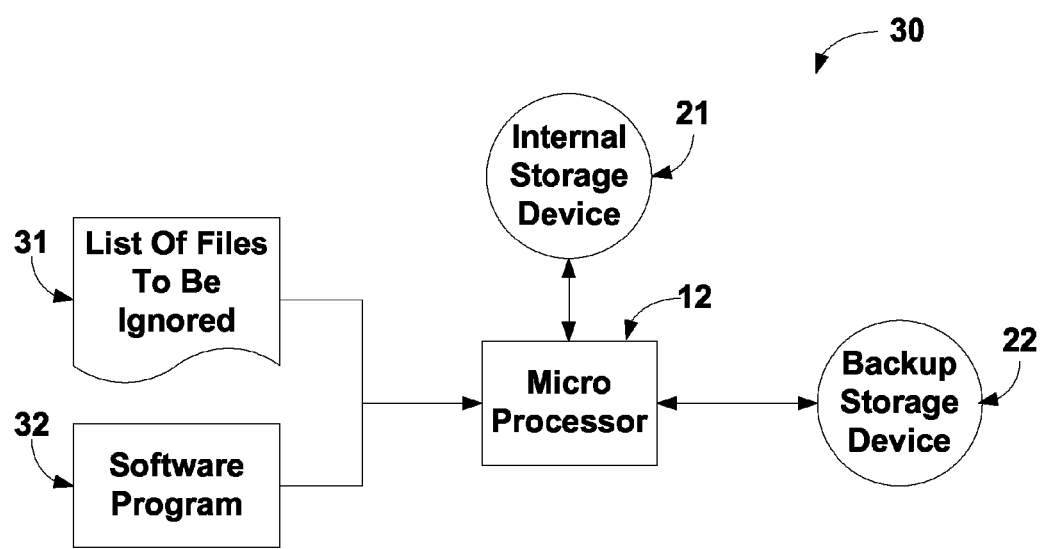
FIG. 2 is a schematic representation of an aspect of the embodiments where by 1 list determines which files are filtered and discarded as they are being transferred to the backup storage device and also contains percentage values when different filter lists are invoked.
Figure 3:
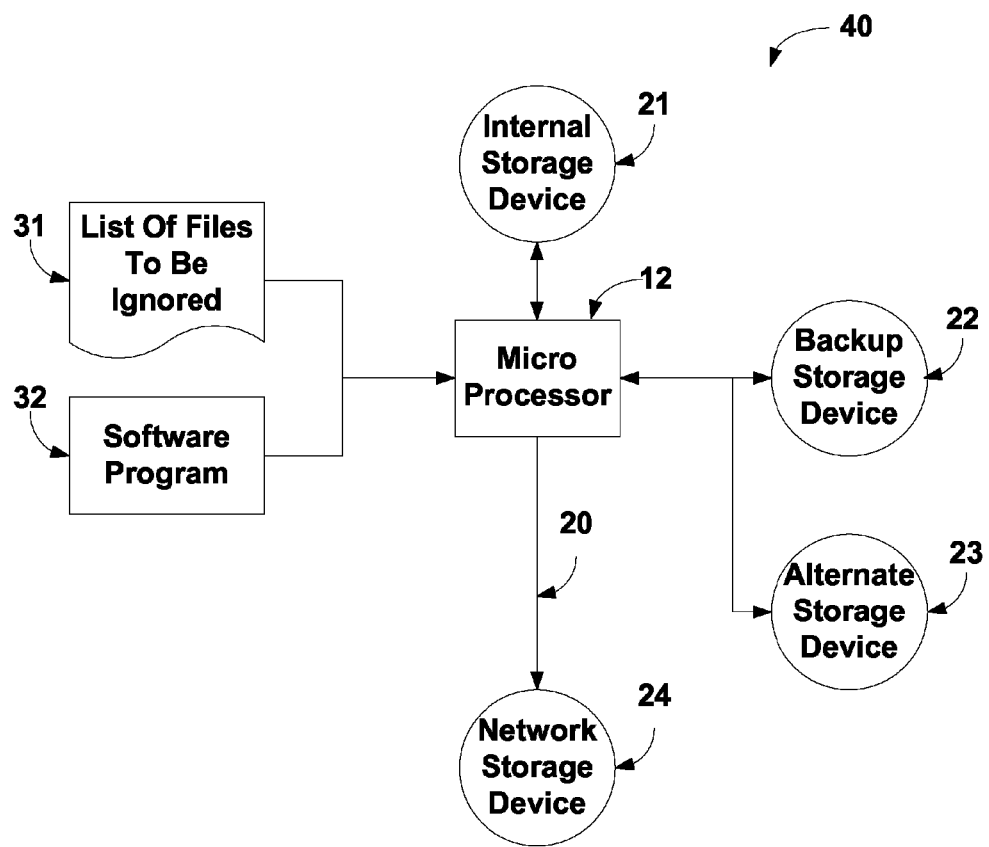
FIG. 3 is a schematic representation of an aspect of the embodiments where by 1 list determines which files are filtered and discarded or transferred to an alternate storage device as they are being transferred to the backup storage device contains percentage values when different filter lists are invoked.
Figure 8:
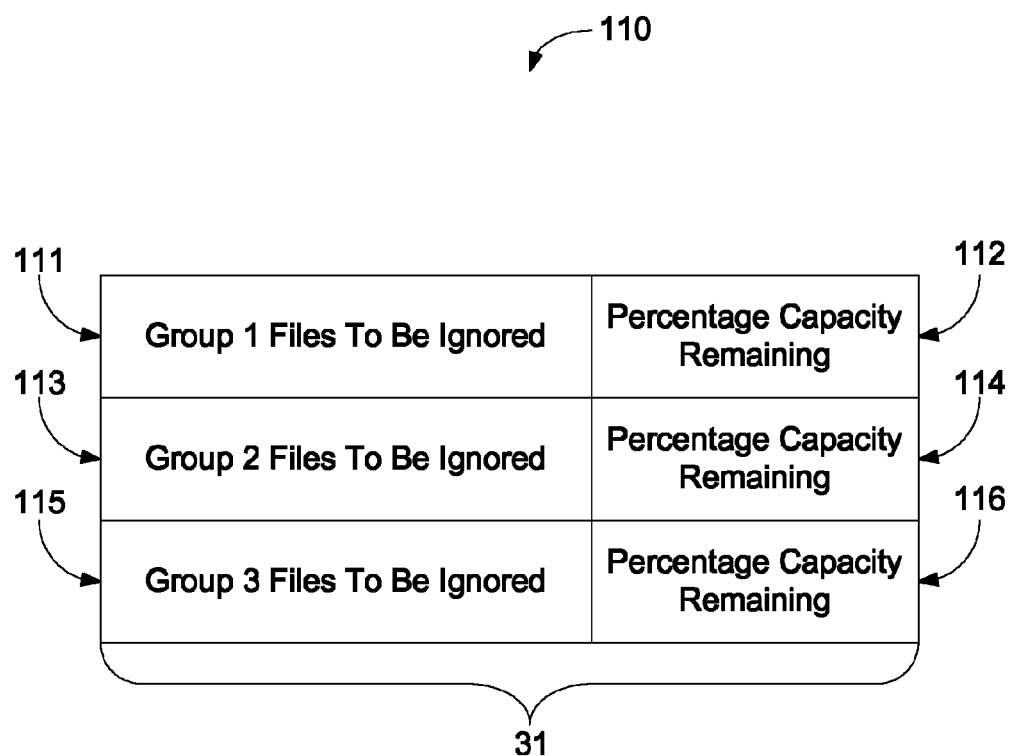
FIG. 8 is a schematic representation of the files to be ignored list with the associated percentage of capacity remaining on the backup storage device.

Now referencing FIGS. 2 and 3 and further referencing list of files to be ignored 31 (in both FIGS. 1, 2, and 8) and software program 32 (in both FIGS. 1 and 2) which uses list of files to be ignored 31. List of files to be ignored 31 as shown in FIG. 8 contains a plurality of sets of identifiers consisting of names of files, names of directory paths, or names of file extensions not to be transferred or backed up and saves of said names of files, names of directory paths, or names of file extensions. Each set or group of these names of files, names of directory paths, or names of file extensions is associated with a percentage of capacity remaining on the backup storage device 22. Notice in FIG. 8 there are 3 groups of files to be ignored represented as 111, 113, and 115. Each of these groups of files to be ignored has an associated percentage capacity remaining represented as 112, 114, and 116. In this representation group 1 files to be ignored 111 is associated with percentage capacity remaining 112 as is group 2 files to be ignored 113 and percentage capacity remaining 114, and group 2 files to be ignored 115 and percentage capacity remaining 116.

These percentages are arranged in decreasing percentages. For example, the starting percentage (for group 1 files to be ignored 111 and percentage capacity remaining 112) would typically be 90% remaining capacity. For this percentage of capacity the user may have decided that all files can be transferred with the exception of temporary files which typically have a file extension of ".tpm". The next percentage mark (for group 2 files to be ignored 113 and percentage capacity remaining 114) may be 80% and once the process reaches a remaining capacity on the backup storage device of 80% the set of files to be filtered would include, in addition to those of the 90% mark, backup files which typically have a file extension of ".bak". The ordering of files to be ignored 31 list may continue to any percentage of capacity.

There are at least four possible embodiments of filter implementation. Two of these embodiments involve leaving files on the backup storage device as new filters are invoked or purging the files contained on the next level of filter off of the backup storage device. Both of these embodiments are described in FIGS. 6 and 7. There are also at least two possible embodiments for obtaining the next filter list. These embodiments involve a next possible set of filter lists and the current set of filters being the last set of filters. Both of these possible embodiments are described with reference to FIGS. 6 and 7.

Now referencing FIG. 2 where 30 is a schematic representation of an embodiment of the embodiments in which two storage devices are present and in which internal storage device 21 is the system storage device in personal computer 11 and backup storage device 22 is an externally attached storage devices and may be rotating magnetic hard disk drives or any of several different commonly used storage devices.

Software program 32 executing on microprocessor 12 manages the backup process. For the embodiments depicted in FIG. 2, software program 32 will transfer files from internal storage device 21 to backup storage device 22 and, as part of the file transfer process filters the files against the current set of filters contained in list of files to be ignored 31. Prior to starting the file transfer process, software program 32 may partition and format backup storage device 22 such that storage device 22 is a bootable storage device. Once the last file on internal storage device 21 has been transferred to backup storage device, the file transfer process is complete.

Now referencing FIG. 3 where 40 is a schematic representation of an embodiment of the embodiments in which 4 storage devices are present and in which internal storage device 21 is the system storage device in personal computer 11, network storage device 24 is a storage device which may be a NAS (network attached storage) device, backup storage device 22 and alternate storage device 23 are externally attached storage devices and may be rotating magnetic hard disk drives or any of several different commonly used storage devices. Software program 32 is the controlling software that manages the backup of internal storage device 21 to backup storage device 22. Software program 32 uses list of files to be ignored 31.

The present embodiment depicted by FIG. 3 includes the ability of software program 32 to save and not discard the files that have been filtered out of the transfer process by transferring those ignored files to alternate storage device 23 or network storage device 24. This allows an IT department to save any files if they are building a computer system for a user where the new internal storage device being built is smaller than the internal storage device in a previous computer. This case is becoming more common as people working in the field are migrating from laptops to web devices or mini notebooks where the internal storage devices are often much smaller than older computers.

Figure 4:
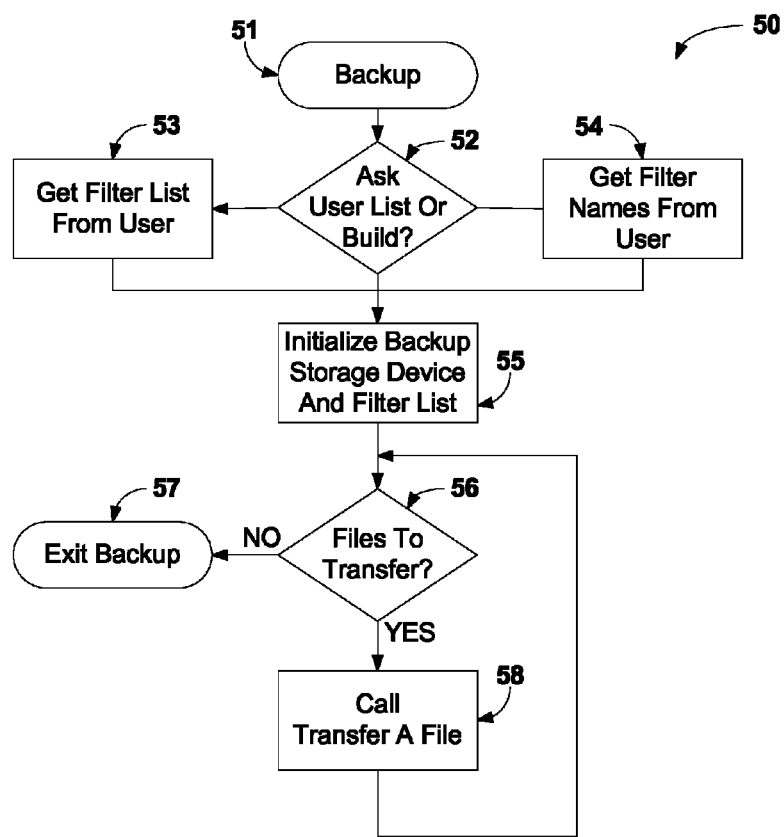
FIG. 4 is a high level flowchart depicting the basic logic flow of the embodiments.

Now referencing FIG. 4 where a logic flowchart depicts an aspect of the embodiments that manages the backup of internal storage device 21 to backup storage device 22. The process for this embodiment starts with entry point backup 51 which passes control to decision block ask user list or build? 52. This decision block queries the user to determine if he wants to provide the name of a filter list (files to be ignored 31) or to build filter list files to be ignored 31 at this time (real time).

If the user indicates a desire to enter the name of a filter list (files to be ignored 31), ask user list or build? 52 will transfer control to process block get filter list from user 53. If the user indicates he wants to build a filter list (files to be ignored 31) ask user list or build? 52 will transfer control to process block get filter names from user 54.

If control was transferred to processing block, get filter list from user 53 then the process block will query the user for the name of a file containing list of files to be ignored 31. The file specified by the user will be opened after which control will be passed to process block initialize backup storage device and filter list 55. If the user indicates an interest in building a filter list then ask user list or build? 52 would have transferred control to processing block get filter names from user 54. This process block will execute a sequence of queries to the user where the percentages of remaining capacity of backup storage device 22 and names of directory paths, or names of file extensions or names of files for each of the percentages of remaining capacity of backup storage device 22 will be gathered and saved in a file (files to be ignored 31). After the user indicates to the queries that all of the data has been captured, control will be transferred to process block initialize backup storage device and filter list 55.

Process block initialize backup storage device and filter list 55 will partition and format backup storage device 22 then copy the systems files and modules from internal storage device 21 to backup storage device 22 which will render backup storage device 22 a bootable storage device. Once this operation is complete control will be passed to decision block files to transfer? 56.

Decision block files to transfer? 56, processing block call transfer a file 58, and exit backup 57 constitute a loop which when executed, will transfer all of the files residing on internal storage device 21 to backup storage device 22. Decision block files to transfer? 56 keeps track of the files left to be transferred from internal storage device 21 to backup storage device 22. Once the last file has been transferred, files to transfer? 56 will exit the loop and software program 32 by passing control to block exit backup 57.

If there are files remaining to be transferred decision block files to transfer? 56 will pass control to process block call transfer a file 58. This processing block will call transfer a file (entry point transfer a file 71) depicted as logic flowchart 70 in FIG. 5. After the next file to be transferred has been transferred, transfer a file 70 will return control back to process block call transfer a file 58 which will then pass control to decision block files to transfer? 56.

Figure 5:
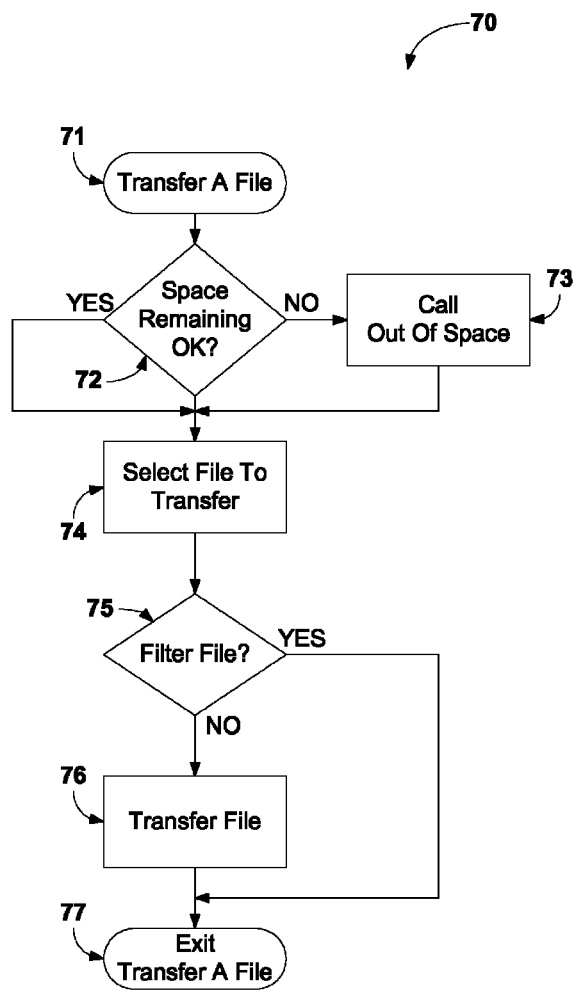
FIG. 5 is a flow chart depicting the basic logic for transferring a single file.

Referring now to FIG. 5 where logic flowchart 70 depicts the process for transferring one file from internal storage device 21 to backup storage device 22. Entry point transfer a file 71 will pass control to decision block space remaining OK? 72. This decision block checks to see if the remaining capacity on backup storage device 22 has reached a predetermined remaining capacity point. If it has, meaning that backup storage device 22 has run out of space and decision block space remaining OK? 72 will pass control to processing block call out of space 73. If the remaining capacity on backup storage device 22 has not reached a predetermined remaining capacity, meaning that sufficient space remains for the current file to be transferred, decision block space remaining OK? 72 will pass control to process block select file to transfer 74. This processing block selects the next file to be transferred from internal storage device 21 to backup storage device 22 then passes control to decision block filter file? 75. This decision block checks the name of the file just selected to be transferred against list of files to be ignored 31. If the current selected file to be transferred is matched against any of the current entries, decision block filter file? 75 will pass control to block exit transfer a file 77. In an alternate embodiment where files to be ignored will, instead of not being transferred to backup storage device 22, will be transferred to alternate storage device 23 or network storage device 24. If the name of the current selected file to be transferred is not matched against list of files to be ignored 31 decision block filter file? 75 will pass control to processing block transfer file 76 which will read the selected file from internal storage device 21 and write it to backup storage device 22. After transferring the selected file from internal storage device 21 to backup storage device 22 control will be transferred to block exit transfer a file 77 which returns control to the calling function.

Figure 6:
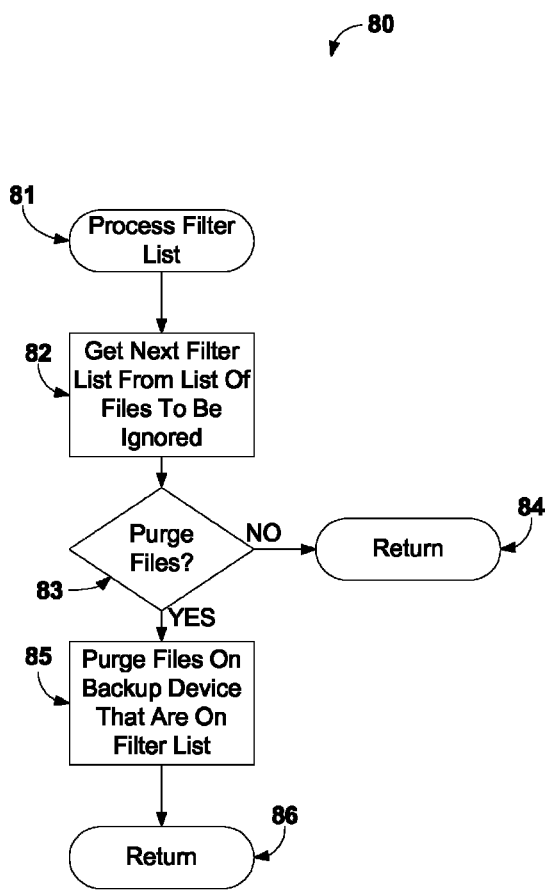
FIG. 6 is a flow chart depicting the basic logic for recovering from the backup storage device running out of capacity.

Now referencing FIG. 6 where process filter list is depicted as logic flowchart 80. In this depiction entry point process filter list 81 passes control to processing block get next filter list from list of files to be ignored 83. This process block obtains the next record or list contained in list of files to be ignored 31. For example, if the current list is group 1 files to be ignored 111 with associated percentage capacity remaining 112 then the next list will be group 2 files to be ignored 113 and associated percentage capacity remaining 114. Once the next filter list has been selected control will be passed to decision block purge files? 83. If the user had indicated or a configuration variable had been preset to purge files when an out of space condition existed, then control will be passed to process block purge files on backup device that are on filter list 85. If the user had indicated or a configuration variable had been preset to NOT purge files when an out of space condition exists then control will be passed to exit block return 84. If control was passed to process block purge files on backup device that are on filter list 85 the backup storage device 22 will be scanned and any file residing on backup storage device 22 that matches the files specified on the current filter list will be deleted from backup storage device 22. In an alternate embodiment of the embodiments where files to be ignored and files that are to be purged are to be transferred from internal storage device 21 (containing files to be ignored), and from backup storage device 22 (files to be purged), to alternate storage device 23 or network storage device 24. After all of the files on backup storage device 22 have been checked control will be passed to exit block return 86.

Figure 7:
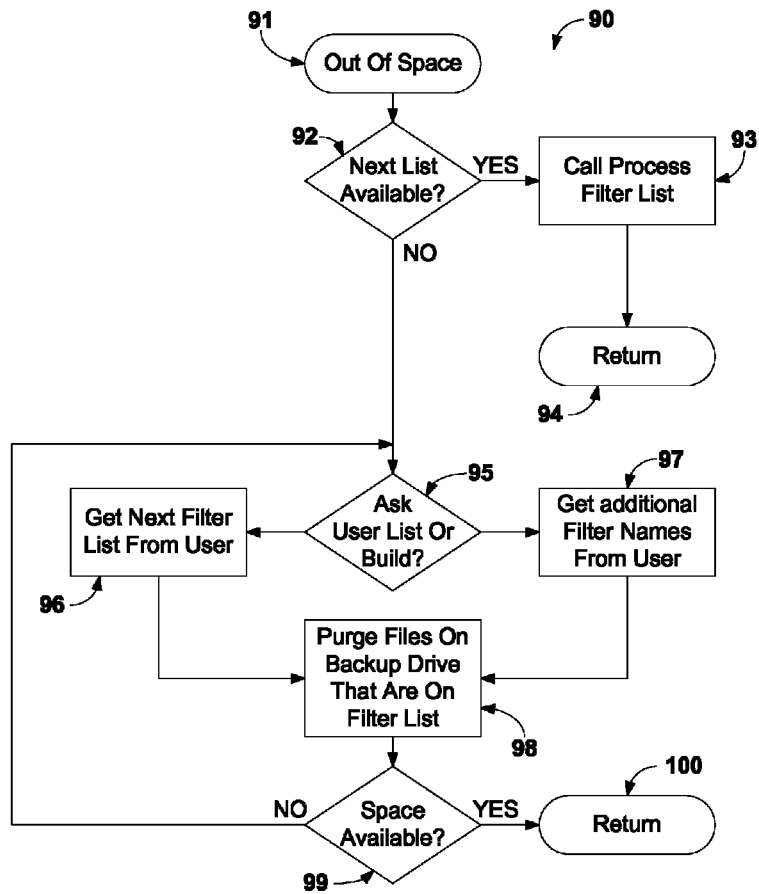
FIG. 7 is a flow chart depicting the automatic logic for recovering from the backup storage device running out of capacity without user intervention.

Now referencing FIG. 7 where the out of space function is represented as 90. This function is called when the remaining capacity of backup storage device 22 has reached some predetermined level as specified in the current percentage capacity remaining entry in files to be ignored 31. Entry point out of space 91 will pass control to decision block next list available? 92. Next list available? 92 will check to see if another entry (group X files to be ignored 111, 113, or 115) is available. There are 2 possible scenarios available. If the current group of files to be ignored is group 1 files to be ignored 111 or group 2 files to be ignored 113 then decision block next list available? 92 will pass control to process block call process filter list 93 which will process the next group 'n' filter list. If the current group of files to be ignored is group 2 files to be ignored 115 then decision block next list available? 92 will pass control to decision block ask user list or build? 95.

This decision block will query the user and ask if he wants to enter the name of the next list of files to be ignored 31 or if he wants to enter the names of files to be ignored and their associated percentage capacity remaining. If the user indicated that he will enter the name of the next list of files to be ignored control will be passed to get next filter list from user 96. If the user indicated that he will enter the names of files to be ignored control will be passed to get additional filter names from user 97. If control was passed to process block get next filter list from user 96 the user will be queried for the name of a list of files to be ignored 31. After the user enters the file name process block get next filter list from user 96 will open the file and pass control to process block purge files on backup drive that are on filter list 98. If decision block ask user list or build? 95 passed control to process block get additional filter names from user 97 the user will be presented with a series of queries to enter the names of files to be ignored and the percentage capacity remaining for the group of files. After the user is finished entering file names control will be passed to process block purge files on backup drive that are on filter list 98.

Process block purge files on backup drive that are on filter list 98 will scan backup storage device 22 and any file residing on backup storage device 22 that matches the files specified on the current filter list will be deleted from backup storage device 22. In an alternate embodiment of the embodiments where files to be ignored and files that are to be purged are to be transferred from internal storage device 21 (containing files to be ignored), and from backup storage device 22 (files to be purged), to alternate storage device 23 or network storage device 24. After all of the files on backup storage device 22 have been checked control will be passed to decision block space available? 99. Decision block space available? 99 will check to see if the remaining capacity on backup storage device 22 is greater than that specified in the current filter list control will be passed to exit block return 100 otherwise control will be passed to decision block ask user list or build? 95.

Equivalent elements can be substituted for the ones set forth above such that they perform in substantially the same manner in substantially the same way for achieving substantially the same result.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art.

Also, the inventors intend that only those claims which use the words "means for" are intended to be interpreted under 35 USC 112, sixth paragraph. Moreover, no limitations from the specification are intended to be read into any claims, unless those limitations are expressly included in the claims.

From the previous descriptions and drawings, it would be observed to one skilled in the art that numerous variations and modifications may be effected without departing from the spirit and scope of the novel concept of the embodiments. It is to be understood that no limitation with respect to the specific methods and apparatus illustrated herein is intended or should be inferred. It is, of course, intended to be covered by the appended claims all such modifications as fall within the scope of the claims.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form.

When operated on a computer, the computer may include a processor that operates to accept user commands, execute instructions and produce output based on those instructions. The processor is preferably connected to a communication bus. The communication bus may include a data channel for facilitating information transfer between storage and other peripheral components of the computer system. The communication bus further may provide a set of signals used for communication with the processor, including a data bus, address bus, and/or control bus.

The communication bus may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or any old or new standard promulgated by the Institute of Electrical and Electronics Engineers ("IEEE") including IEEE 488 general-purpose interface bus ("GPIB"), and the like.

A computer system used according to the present application preferably includes a main memory and may also include a secondary memory. The main memory provides storage of instructions and data for programs executing on the processor. The main memory is typically semiconductor-based memory such as dynamic random access memory ("DRAM") and/or static random access memory ("SRAM"). The secondary memory may optionally include a hard disk drive and/or a solid state memory and/or removable storage drive for example an external hard drive, thumb drive, a digital versatile disc ("DVD") drive, etc.

At least one possible storage medium is preferably a computer readable medium having stored thereon computer executable code (i.e., software) and/or data thereon in a non-transitory form. The computer software or data stored on the removable storage medium is read into the computer system as electrical communication signals.

The computer system may also include a communication interface. The communication interface allows' software and data to be transferred between computer system and external devices (e.g. printers), networks, or information sources. For example, computer software or executable code may be transferred to the computer to allow the computer to carry out the functions and operations described herein. The computer system can be a network-connected server with a communication interface. The communication interface may be a wired network card, or a Wireless, e.g., Wifi network card.

Software and data transferred via the communication interface are generally in the form of electrical communication signals.

Computer executable code (i.e., computer programs or software) are stored in the memory and/or received via communication interface and executed as received. The code can be compiled code or interpreted code or website code, or any other kind of code.

A "computer readable medium" can be any media used to provide computer executable code (e.g., software and computer programs and website pages), e.g., hard drive, USB drive or other. The software, when executed by the processor, preferably causes the processor to perform the inventive features and functions previously described herein.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system for backing up a source storage device comprising:
    a personal computer having a processor;
    a first storage device, where the said first storage device is a primary storage device for said personal computer;
    said first storage device storing a first list of files that will not be arranged in groups, with each group comprising a first criteria indicative of plural files, and an associated indication of remaining capacity of a backup storage device associated with said first criteria;
    said first criteria comprises names representing part or all of a name of files or names of directories and subdirectories or file extensions denoting types of files; said processor running a first software program that operates to format said backup storage device as mirroring those portions of said first storage device including: master boot record and associated sectors referenced by said master boot record, and said first storage device's file system structure making said backup storage device bootable prior to initially backing up files from said primary storage device to said backup storage device;
    said first software program subsequently backs up files from said primary storage device to the backup storage device and then checks a remaining capacity of the backup storage device based on files from said primary storage device having been transferred to said backup storage device and when the remaining capacity is determined as being less than at least one of a percentage of remaining capacity of said backup storage device listed in at least a first group of said first list of files, purging those files residing on said backup storage device from said backup storage device which match the first criteria.

2. The system as in claim 1, further comprising the backup storage device.

3. The system as in claim 1, further comprising a connection to at least a first external bus on said personal computer, and wherein said backup storage device is connected to said first external bus.

4. The system as in claim 1, wherein said first software program checks each file residing on said primary storage device against the first criteria prior transferring to said backup storage device, and not transferring at least one file that matches the criteria when said criteria matches.

5. The system as in claim 1, wherein said first software program determines a remaining storage capacity of said backup storage device being decreased by an amount which prevents at least next file that is transferred from said primary storage device to said backup storage device being contained therein, and said first software program operates to query a user to enter a second criteria denoting files being purged from said backup storage device, where said second criteria renders a remaining storage capacity of said backup storage device as sufficient to contain the at least next file being transferred from said primary storage device to said backup storage device.

6. A method for backing up a source storage device comprising:
    storing a first list of files arranged in groups, with each group comprising a first criteria indicative of plural files, and each group having an associated indication of remaining capacity of a backup storage device associated with said first criteria;
    said first criteria comprises names representing part or all of a name of files or names of directories and subdirectories or file extensions denoting types of files;
    a first software program that operates to format said backup storage device as mirroring those portions of a primary storage device including:
    master boot record and associated sectors referenced by said master boot record, and said first storage device's file system structure making said backup storage device bootable prior to initially backing up files from said primary storage device to said backup storage device;
        backing up files from said primary storage device after said backup storage device has been formatted to the backup storage device, including checking a remaining capacity of the backup storage device based on files from said primary storage device having been transferred to said backup storage device;
        determining that a remaining capacity is less than at least one of a percentage of remaining capacity of said backup storage device listed in at least a first group of said first list of files; and
        purging files residing on said backup storage device from said backup storage device that match the first criteria and when the remaining capacity is less than at least one of the said percentage of remaining capacity of said backup storage device.

* * * * *